PLANOGRAPHIC PRINTING PLATES

Filed Nov. 28, 1955

HAROLD R. DALTON
MURRAY WOLF
INVENTORS

BY John J. Rogan
ATTORNEY

United States Patent Office 2,983,221

Patented May 9, 1961

2,983,221

PLANOGRAPHIC PRINTING PLATES

Harold R. Dalton, Jenkintown, Pa., and Murray Wolf, Flushing, N.Y., assignors to Timefax Corporation, New York, N.Y., a corporation of New York Filed Nov. 28, 1955, Ser. No. 549,305

12 Claims. (Cl. 101—149.2)

This invention relates to planographic printing plates and to methods of manufacture thereof.

A principal object of the invention is to provide an improved planographic printing plate of the cellulosic base or backing kind, which can be imaged or recorded thereon either by electric voltages acting thereon, such as facsimile electric signals, or mechanically such as by writing, typing, or printing directly thereon. Planographic plates of the first kind are known in the art as electro-responsive plates, and plates of the second kind are known in the art as direct image plates. Either kind of plate can be used as a master in any well known offset planographic printing press or duplicator mechanism.

As is well known in the lithographic or planographic printing art, the lithographic surface must be such that it will be receptive to fatty and greasy lithographic inks and imaging materials and yet, through proper treatment with repellent solutions used on lithographic presses and duplicators, be capable of being made repellent to these same fatty and greasy materials. At the same time, the lithographic surface must be flexible, water insoluble, resistant to the action of common solvents, and it must be free from objectionable toning. In other words, it is necessary that the lithographic surface have over its entire useful area, substantially uniform lithographic properties.

Accordingly, one of the principal objects of this invention is to produce a planographic printing plate with a lithographic surface which has all the above-noted and other desirable properties.

Another object is to provide a novel coating for planographic printing plates, which coating is constituted of, or contains as an ingredient thereof, an organo-titanium ester in which the ester group contains not more than four carbon atoms.

Another object is to provide an improved correction fluid for lithographic surfaces.

A feature of the invention relates to an improved direct imaging planographic printing plate of the kind having a cellulosic base or backing.

Another feature relates to an improved electro-responsive planographic printing plate of the kind having a cellulosic base or backing.

Other features and advantages not specifically enumerated, will be apparent after a consideration of the following detailed descriptions and the appended claims.

In the drawing, which shows certain typical embodiments of the invention,

Figure 1:
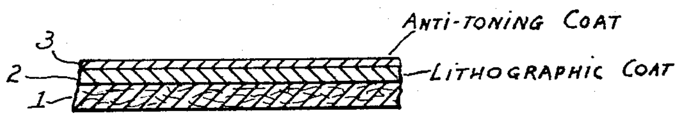
Fig. 1 is a magnified cross-sectional view of a portion of a planographic printing plate of the direct imaging kind.

The construction of paper or cellulose base planographic printing plates is such that if the lithographic coating varies excessively in such properties as thickness, density or porosity, smoothness, etc., overall toning will most likely occur. That is especially true in the case of electro-responsive planographic printing plates where it is necessary to keep the top or lithographic coating as thin as possible so as to obtain the best possible reproduction characteristics.

It has been found that the toning which results from the above causes may be eliminated, according to the invention, by using a tetra organo derivative of ortho titanic acid as an auxiliary coating applied in a non-aqueous solvent beneath or above the lithographic coating. We have also found that in the case of electro-responsive planographic plates these same compounds are similarly effective when used as an ingredient in the coating immediately below the lithographic coating. Such lithographic coatings are disclosed in our co-pending application Serial No. 494,683 filed March 16, 1955.

The preferred tetra organo derivatives of ortho titanic acid are the alkyl esters, containing four or less carbon atoms, such as methyl, ethyl, propyl and isopropyl esters of ortho titanic acid. As the number of carbon atoms in the alkyl group becomes larger, the esters become more difficult to polymerize with water, and for the purpose of planographic printing plates, good uniformity is less likely to be obtained. Furthermore, the affinity of the higher polymers for lithographic inks, becomes greater as the carbon chain length increases. Thus the tetra-stearyl ortho titanate is useless for the purposes of this invention.

The ortho titanic acid ester coatings according to the invention, are applied from an anhydrous solvent system and the dried films are later reacted with water to produce a polymeric water-sensitive reaction product. This polymer may be an organo titanium compound or a polymer of titanium dioxide, depending upon the amount of water used. However either polymer is satisfactory for the purposes of this invention.

The anhydrous solvents for the ortho titanic acid ester coatings, include the water miscible solvents such as methanol, ethanol, acetone, methyl ethyl ketone, tetra-hydro furane, etc., and the water immiscible solvents such as mineral spirits and napthas.

The choice of the solvent is immaterial except for the fact that it must not affect any of the previously applied coatings on the planographic plate. The range of concentrations of the ortho titanic acid ester in the solvent may be from 10% to 100%, although the optimum concentration is in the range of 15% to 50%. An example of a satisfactory coating solution is one containing 20% tetraisopropyl titanate in tetrahydrofurane. The solution may be applied by any well known coating means such as brushing, spraying, roll coating, knife coating, etc. Sufficient coating should be applied so that when dry, a film weight of 0.25 to 3.00 pounds per ream (24" by 36"—500 sheets), results.

If the ortho titanic acid ester is used as a compound of the coating immediately below the lithographic coating as mentioned above, it should be present to the extent of 10% to 50% of the composition of the coating.

After the ortho titanic acid ester coating is dried, it is reacted with water to form the reaction polymer. If the lithographic coating solution contains water, application of this coating over the ortho titanic acid ester film accomplishes the desired result. However, if the ortho titanic acid ester film is applied on the lithograph coating, it must be treated separately with water, steam, auxiliary water base surface coating, etc., to produce the polymer.

Referring to Fig. 1 there is shown in magnified cross-section a portion of a direct imaging planographic plate according to the invention. It comprises a backing 1 of cellulosic material such as wet strength paper, for example bleached kraft paper which has been suitably sized with any well-known sizing agent such as urea or melamine formaldehyde resins. Applied to the sized paper in any suitable way, is a lithographic coating 2 of any well-known composition, preferably as disclosed in application Serial 494,683.

After the lithographic coating has been dried, there is applied to it in any suitable manner, the novel auxiliary coating 3 which, according to the invention, consists in whole or in part, of an organo-titanium ester in which the ester group contains four or less carbon atoms. For example it may be orthotitanic acid ester, or titanium dioxide polymer. The auxiliary coating 3 is then dried and reacted with water to form the desired reaction polymer as hereinabove mentioned.

Figure 2:
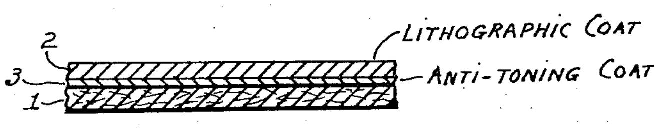
Fig. 2 is a modification of the plate of Fig. 1.

Fig. 2 shows a modification of the planographic plate of Fig. 1. In this embodiment of Fig. 2 the same materials may be used as in the embodiment of Fig. 1, but the auxiliary coating 3 is first applied before applying the lithographic coating 2. In other words, the coating 2 is superposed on the auxiliary coating 3.

Figure 3:
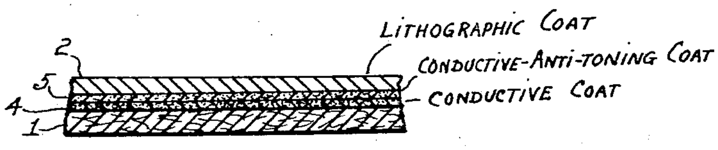
Fig. 3 is a magnified cross-sectional view of a portion of an electro-responsive planographic plate.

Fig. 3 shows an electro-responsive planographic plate according to the invention. The elements of Fig. 3 which are the same as those of Figs. 1 and 2 bear the same designation numerals in the several figures. The wet strength and sized paper or cellulose backing 1 has applied thereto a base coating 4 which is electrically conductive. Coating 4 may comprise, for example, acetylene black or other electrically conducting carbon black, mixed with a suitable binder such as polyvinyl chloride, polyvinyl acetate, acrylonitrile polymers, cellulose ethers or esters, copolymers of vinyl chloride, vinyl acetate, vinylidene chloride polymers, etc.

Over the base conductive coating 4 is applied in any suitable manner, another conductive coating 5 which includes in addition to powdered conductive carbon, an organo-titanium ester in which the ester group contains four or less carbon atoms. The ester may be any of the materials described hereinabove for the coating 3 of Figs. 1 and 2. For example it may be a conductive coating containing powdered carbon with any of the binders previously mentioned for coating 4, and any of the organo-titanium compounds mentioned. However the amount of carbon, or the form of carbon used in coating 5 is preferably chosen so that coating 5 has substantially lower conductivity than coating 4. After coating 5 has been dried, the lithographic coating 2 is then applied and dried. The manner of preparing such conductive coatings is wellknown in the prior art, as exemplified by U.S. Patent No. 2,664,043.

Figure 4:
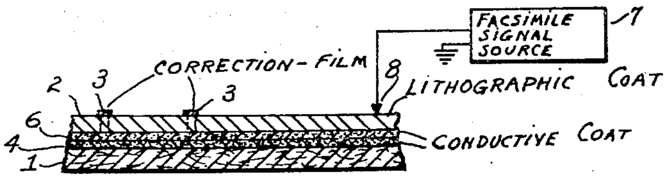
Fig. 4 is a modification of the plate of Fig. 3 and illustrating the use of the improved lithographic correction fluid.

One of the important features of the invention is that the organo-titanium ester can be used as a correction fluid ingredient, for effecting corrections or masking of any desired area of the lithographic plate. As is well-known, among the problems encountered in using planographic plates is the necessity of being able to mask out undesirable text or marks. That problem is especially important in the case of electro-responsive planographic printing plates. The masking effect of the novel masking fluid is applicable not only to the novel electro-responsive plate as shown in Fig. 3, but also to plates such as disclosed in our co-pending application Serial No. 494,683. Thus as shown in Fig. 4 the plate may comprise a paper backing 1 similar to that of Fig. 3. The backing has a base conductive coating 4 similar to coating 4 of Fig. 3, and another conductive coating 6 which may be the same as coating 5 of Fig. 3 either with or without the organo-titanium ester or tetra-organo derivative of ortho titanic acid as above mentioned. Over the coating 6 is applied the lithographic coating 2.

When electric facsimile signals from any wellknown signal source 7 are applied to the top face of the plate, for example by means of the electrically energized pointed stylus electrode 8, the coating 2 and in some cases also coatings 4 and 6 are perforated in minute areas as represented by the dotted lines in Fig. 4, but without perforating the backing 1. It will be understood that the stylus 8 can be energized either with direct current signals or with alternating current signals. In the direct current method the lower resistance coating 4 is returned conductively to ground, while in the alternating current method the coating 4 is capacitively returned to ground through the backing 1 and the grounded metal drum or other support (not shown) on which the plate is mounted.

During the action of the electric facsimile voltages impressed upon the planographic plate by the stylus 8, the lithographic coating 2 is removed at the minute areas beneath the stylus as the latter is traversed over the plate surface. This exposes coating 6, and at some times perforating coating 6 and exposing coating 4. Both coatings 4 and 6 are receptive to the greasy or fatty printing inks distributed over the surface of the plate by the usual ink distributor rollers of any wellknown planographic printing press. Lithographic coating 2 controls the receptivity of water by the plate thus providing a clean tone-free background if the coating 6 contains any of the organo-titanium esters or anti-toning materials hereinabove mentioned.

As often happens, the text or other subject-matter which is recorded on the plate, includes marks or material which is not desired in the duplicate copy. In some cases it may not be possible to delete the undesired portions of the text on the original from which the facsimile signals are derived. Thus a situation arises where the undesirable material appears on the electro-responsive printing plate. A similar situation arises where the original material consists of a series of paste-ups. In that case undesirable lines are produced in the telefacsimile recordings on the plate, and corresponding to the demarcations between the adjacent pasted-up sections. We have found that if a small quantity of a tetra-organo derivative of ortho titanic acid dissolved in a solvent, is painted over the undesirable text or marks on the recorded plate, and the plate is then subjected to moisture after evaporation of the solvent, such as in the well known etching step in preparation for running on the press, a continuous transparent pigment-free adherent water-sensitive coating, which is the polymeric condensation product of water and the tetra organo derivative of ortho titanic acid, is formed over the undesirable material. This coating prevents the ink on the planographic printing equipment from contacting the ink receptive burned out areas of the plate over which areas the masking coating has been applied.

In the case of direct imaging planographic printing plates, an error is corrected by making an erasure. This erasure abrades the lithographic coating slightly, making the surface slightly grease receptive, with the result that the correction shows upon the duplicated copy as a fuzzy image or as a dark smear. We have found that if a small quantity of a tetra-organo derivative of ortho titanic acid dissolved in a solvent, is painted over the erased area prior to retyping, and the correction is treated with water or a water solution such, for example, as that used to wet the plate down before running it on a planographic press or duplicator, a clear continuous adherent pigment-free water-sensitive coating, which is the polymeric condensation product of the tetra-organic derivative of ortho titanic acid and the water, is formed over the erased area. That water-sensitive coating prevents the ink on the rollers of the planographic printing or duplicating equipment from depositing thereon. Furthermore, if text or other subject-matter should be placed on a direct image planographic printing plate which at some later time is to be removed, it is not necessary to erase at all. By simply following the masking procedure described hereinabove, the undesired text or subject-matter can be masked by painting it with a solution of tetra-organo derivative of ortho titanic acid in a solvent.

While we have shown our novel coatings as applied to direct image and electro-responsive planographic printing plates, it is not intended that the invention be restricted to those two forms. It is also applicable to pre-sensitized planographic printing plates. In that case the organo-titanium ester films can only be applied beneath the pre-sensitized coating or beneath the lithographic coating.

What is claimed is:

1. A planographic printing plate comprising a backing member, a lithographic coating carried by said member, and another coating comprising a tetra-organo ester derivative of ortho titanic acid in which the ester group contains four or less carbon atoms, and said other coating is adjacent said lithographic coating and when dry is repellent to lithographic printing ink.

2. A planographic printing plate according to claim 1 in which said other coating is located between said backing and said lithographic coating.

3. A planographic printing plate according to claim 1 in which said lithographic coating is located between said other coat and said backing.

4. An electro-responsive planographic printing plate comprising a backing member, a lithographic coating for said member, and an electrically conductive layer between said lithographic coating and said backing, said conductive layer including a tetra-organo ester derivative of ortho titanic acid which in dry form is repellent to lithographic printing ink.

5. A planographic printing plate comprising a backing member, a lithographic coating carried by said member, and another coating under the lithographic coating comprising a tetra-organo ester derivative of ortho-titanic acid in which the ester group contains four or less carbon atoms, said other coating including electrically conductive powdered carbon.

6. An electro-responsive planographic printing plate having a lithographic surface coating, and another coating adjacent the lithographic coating and including a tetra-organo ester derivative of ortho titanic acid which in dried form is repellent to lithographic printing ink which includes a coating adjacent to the lithographic surface in the form of a tetra-organo ester derivative of ortho-titanic acid which in dried form is repellent to lithographic printing ink.

7. A planographic printing plate comprising a cellulosic backing member having a lithographic coating thereon, said lithographic coating being provided with an adjacent anti-toning coating in the form of a dried anhydrous solution of a tetra-organo ester derivative of an ortho titanic acid in which the ester group contains four or less carbon atoms.

8. A planographic printing plate according to claim 7 in which the said anti-toning coating is a water sensitive reaction product which is the result of the treatment of said ester with water.

9. A planographic printing plate according to claim 7 in which the said anti-toning coating is in the form of a dried solution of the said ester in a water miscible solvent.

10. A planographic printing plate according to claim 7 in which the range of concentration of the ortho titanic acid ester in the said anti-toning coating is from 10 percent to 100 percent.

11. A planographic printing plate according to claim 7 in which the said anti-toning coating is in the form of a dried solution of the said ester in a water immiscible solvent.

12. In the art of lithography, the method of treating selected areas in a lithographic plate for surface correction which comprises applying to those areas a coating in the form of a tetra-organo ester derivative of ortho titanic acid in which the ester group contains four or less carbon atoms.

References Cited in the file of this patent

UNITED STATES PATENTS

| | | |
|---|---|---|
| 2,187,821 | Nolles | Jan. 23, 1940 |
| 2,635,537 | Worthen | Apr. 21, 1953 |
| 2,663,720 | Hill | Dec. 22, 1953 |
| 2,689,858 | Boyd | Sept. 21, 1954 |
| 2,732,799 | Haslam | Jan. 31, 1956 |
| 2,768,907 | Lusby | Oct. 30, 1956 |

OTHER REFERENCES

Kraitzer et al.: Esters of Titanium, J. Oil and Colour Chem. Assoc., 1948, v. 31, pp. 405 to 417, only pp. 406, 407 and 415 made of record.